United States Patent [19]

Taylor

[11] Patent Number: 4,630,986
[45] Date of Patent: Dec. 23, 1986

[54] BALE HANDLER

[76] Inventor: Robert W. A. Taylor, Island Rd., Cohuna, Victoria, Australia

[21] Appl. No.: 706,988

[22] Filed: Feb. 28, 1985

[30] Foreign Application Priority Data

Mar. 29, 1984 [AU] Australia .............................. PG4317
Aug. 13, 1984 [AU] Australia .............................. PG6532

[51] Int. Cl.$^4$ ............................................ A01D 87/12
[52] U.S. Cl. .................. 414/24.6; 414/24.5; 414/38; 414/44; 414/552
[58] Field of Search .................... 414/24.5, 24.6, 38, 414/39, 44, 111, 552, 469, 484, 485; 242/86.5 R, 86.52

[56] References Cited

U.S. PATENT DOCUMENTS

| | | | |
|---|---|---|---|
| 2,743,883 | 5/1956 | Farmer ............................ | 242/86.5 R |
| 2,804,219 | 8/1957 | Hewson et al. ...................... | 414/552 |
| 3,341,039 | 9/1967 | Cranage .............................. | 414/111 |
| 3,373,882 | 3/1968 | Forest ................................ | 414/39 |
| 3,918,595 | 11/1975 | Godfrey et al. ..................... | 414/38 |
| 4,042,140 | 8/1977 | McFarland ......................... | 414/24.6 |
| 4,044,967 | 8/1977 | Guichon ............................. | 414/24.6 |
| 4,050,598 | 9/1977 | Schurz ............................... | 414/24.5 X |
| 4,084,707 | 4/1978 | McFarland ......................... | 414/24.6 |
| 4,259,034 | 3/1981 | Ward et al. ......................... | 414/24.6 |
| 4,261,676 | 4/1981 | Balling ............................... | 414/24.5 |
| 4,354,556 | 10/1982 | Evans ................................ | 242/86.52 X |

FOREIGN PATENT DOCUMENTS

| | | | |
|---|---|---|---|
| 1011297 | 5/1977 | Canada ............................... | 414/24.5 |
| 2007184 | 5/1979 | United Kingdom ............... | 414/24.5 |

Primary Examiner—Leslie J. Paperner
Attorney, Agent, or Firm—Sughrue, Mion, Zinn, MacPeak and Seas

[57] ABSTRACT

A bale handler includes a body with ground wheels and a bed for supporting two or more round bales end-to-end rotatably supported for rearward tilting movement about a horizontal axis to unload the bales as a vertical stack. A secondary support is provided and supports the bales as the bed is tilted. The bed may be brought to an unloading/reloading position past vertical at which the stack remains stable and the secondary support bears the weight of the rear of the handler. The aforesaid axis is positioned so that the portion of the bed between the secondary support and the axis is sufficient to stabilize the stack during reloading.

A bale loading cradle includes a pair of laterally spaced support members which pass under a bale to lift and support it and which define at their forward ends opposed edges which, in a horizontal plane, are mutually forwardly divergent and are configured for centering a bale approached off-center. Each support member is tapered at its forward end to facilitate engagement under a bale. The cradle further has means to restrain the bale respectively to its rear and outer sides.

16 Claims, 12 Drawing Figures

BALE HANDLER

This invention relates to a bale handler, especially to a handler adapted to load and/or manipulate cylindrical hay bales, commonly known as round bales or hay rolls.

A primary purpose of bale handlers is the transport of bales from paddock to stack and vice-versa. Many machines adapted to pick up and transport round bales can only handle one bale at a time, but a number of machines have been proposed, and in some cases manufactured, for the purpose of transporting several bales per trip. These machines typically include a towable trailer vehicle defining a somewhat elongate bed or platform with one or more longitudinally extending conveyors for moving the bales along the bed. Bales are picked up and lifted onto the bed from front, rear or side.

A typical commercial machine of the side-loading variety is disclosed in Austrailan patent specification 515,415 to Fry. The bale support bed is a tray which is rearwardly tiltable for unloading the three bales as a vertical end-to-end stack. The facilitate unloading and recovery of this stack for delivery of the hay to stock, the tray is fitted with a clamp arm which is engaged with the top bale of the stack to hold the stack in place: the top two bales of the stack would otherwise tend to fall back off the bottom bale when the stack is at or near vertical. The clamp gives rise to another problem however, viz. the popping out of one or more bales due to excessive clamping force. In accordance with a first aspect of the invention, the requirement for a clamp or like device is obviated by providing for the tray bed to be brought to a position angularly displaced past the vertical.

The invention therefore affords, in its first aspect, a bale handler which includes a body with ground wheels, and a bed for supporting two or more round bales end-to-end. The bed is mounted to the body for rearward tilting movement about a horizontal axis to unload the bales as a vertical stack. The handler further includes means to effect such rearward tilting movement of the bed, and a secondary support at the rear end of the bed for abutting the rearmost bale thereon and supporting the bales as the bed is tilted. By means of said rearward tilting movement, the bed may be brought from a fully lowered position to an unloading/reloading position past vertical, at which the stack remains stable and the secondary support contacts the ground and bears the weight of the bed and bales thereon. Said axis is displaced from said rear end of the bed in a direction parallel to the bed so that the portion of said bed between said support and said axis which moves rearwardly as the bed is lowered from said position during reloading is sufficient to stabilize the stack.

Preferably, said axis is close behind the vertical plane containing the axis of the ground wheels, and the bed in its fully lowered position is disposed just above one or more axles for the ground wheels.

In the aforedescribed Fry handler (Australian Pat. No. 515,415) the side loading and unloading member comprises a laterally projecting arm with forwardly directed prongs which may be brought under and into engagement with a bale aligned with its axis parallel to the prongs. The arm is pivoted on a horizontal axis so that the whole member can be pivotally raised to a position where the bale will roll onto the platform. This arrangement necessitates very accurate alignment of the loading prongs if the bale is not to be speared and requires that the vehicle be substantially stopped for each pick up. A somewhat similar pick up is described in U.S. Pat. No. 3,924,765 to Hostetler. U.S. Pat. No. 4,249,842 to Johnson suggests that the bales be picked up "on-the-run" and for this purpose provides a side-loading fork which has a solid upright back and rotates on a vertical axis. A like but up-and-over loading device is shown in U.S. Pat. No. 4,329,102 to Gray.

In its second aspect, the invention is concerned with achieving improved operation of side-loading bale handler/transporters. The invention accordingly provides, in this second aspect, a bale handler comprising a vehicle which defines a bed for supporting bales, and a loading cradle which is mounted to the vehicle, preferably laterally of the bed, for picking up bales from the ground on-the-run and which is movable to transfer a picked up bale onto the bed. The loading cradle comprises a pair of laterally spaced support members and restraint means preferably a pair of restraint members. The support members project in the direction of travel of the vehicle for passing under a bale to lift and support it and define at their forward ends opposed edges which, in a horizontal plane, are mutually forwardly divergent and are configured for centering a bale aproached off-centre. The edges may be so configured by being asymmetrical, preferably by exhibiting different lateral taper angles. Each support member is tapered at its forward end in both vertical and horizontal planes to facilitate engagement under a bale. The restraint members are positioned to restrain the bale respectively to its rear and outer sides, relative to the vehicle, as it is lifted and supported by the support members.

The outer side bale restraint member advantageously flares outwardly at its forward end in a manner complementary to the forwardly divergent edge of the nearer of said support members.

The cradle preferably includes mounting arms which project laterally of the vehicle and are pivoted to the vehicle so that the cradle may be lifted to cause the bale to roll onto said vehicle bed. One of these arms may include said rear bale restraint member. The cradle is preferably of variable width, for example by telescopic adjustment of said mounting arms, to allow for bales of differing diameter.

It was earlier noted herein that the bale support bed in prior machines includes one or more conveyors for moving bales along the bed, usually either way. Generally, these conveyors extend the whole length of the support bed, as for example in the Fry machine and in the machines of U.S. Pat. Nos. 4,429,102 to Gray, 4,376,607 to Gibson, 4,103,794 to Shaw, 4,076,138 to Honomichl, 3,924,765 to Hostetler and 4,249,842 to Johnson. The present inventor has realized, in a preferred aspect of the invention, that end-to-end extent is unsatisfactory as it may subject an end bale to excessive friction and wear, possibly resulting in rupture of the twine binding the bale.

The aforedescribed bale handler, in either aspect of the invention, may therefore include conveyor means extending part of the length of the bed, for moving bales to and fro on the bed, the rear bale engaging extremity of the conveyor means being so disposed with respect to an abutment means for the bales at or near said one end that the conveyor means just effectively engages the rearmost bale when it is contact with the abutment means. By "just edffective" engagement is meant engagement just sufficient for the conveyor means to move the rearmost bale forwardly along the bed. The abutment means may conveniently comprise the aforesaid secondary support, which itself is preferably a pair of elongate forks upstanding with respect to the bed.

The majority of prior bale handlers of the type having a support bed for plural bales do not include mechanisms for unwinding the bale and feeding it out; typically, the bale is simply offloaded. Feed-out mechanisms are shown in U.S. Pat. Nos. 4,042,140 to McFarland and 4,441,845 to Gibson. The former proposes a pair of trailing arms which are separable to allow opposed stubshafts to engage a bale for unrolling it by drawing it along the ground. The latter illustrates a transverse conveyor arrangement. Other feed-out mechanisms include mechanical unwinders but these incorporate transmissions and are slow and often unreliable. The present inventor contemplates two alternative feed-out mechanisms.

In one of these alternatives a bale feed-out mechanism is provided at one bale station on the aforementioned bale supporting bed of the bale handler. The mechanism includes means to simultaneously rotate the bale and periodically bounce it up and down. Such means may include a pair of co-drivable rollers spaced to support a bale parallel to its axis, and periodic displacement means in conjunction with the rollers. The latter means may comprise one or more transverse members which are moved up and down by the rotating rollers, for example by pegs or rods projecting from an end face of each roller.

In the other alternative, the invention affords a bale handler comprising a vehicle which defines a bed for supporting bales, and a bale feed-out mechanism at one bale station on the bed. The mechanism includes prong means, preferably at least two prongs, dimensioned to engage and hold a round bale, a carriage for the prong means means mounting said carriage to said vehicle, and a motor having an output shaft directly coupled to said prong means for rotating the prong means and thereby a bale held thereon. The carriage is preferably mounted to the vehicle for movement between a bale engaging position in which the prong means projects forwardly at a central location with respect to the bed, an inoperative position in which the mechanism is retracted to the side of the bed, and a feed-out position in which the prong means projects rearwardly upwardly with respect to the bed and in which a bale held on the prong means may be fed out by rotating the prong means.

The invention will now be described, by way of example only, with reference to the accompanying drawings, in which.

The illustrated handler 10 includes a vehicle 12 which comprises an A-frame chassis 14, ground wheels 16, 17 and a somewhat elongate bed for supporting standard round bales end-to-end, in the form of a rearwardly tiltable tray 18. Chassis 14 carries a forward side-acting bale loading cradle 20. Tray 18 mounts a retractable feed-out mechanism 122 at the rear and has two endless chains 25a, 25b in its floor to serve as conveyor means 24 for moving bales back and forth on the tray.

In operation of the handler, three round bales are picked up in turn by cradle 20, deposited on tray 18 and moved rearwardly by means of conveyor chains 25a, and 25b. The three bales are transported to a storage site where three may be either vertically stacked end-to-end by rearwardly tilting back tray 18, or horizontally stacked by activating conveyor chains 25a, 25b to drive the bales out the rear of the partially tilted tray. For recovery of a vertical stack and delivery of hay to stock, tray 18 reloads the stack and brings it back to horizontal. A horizontal stack is recovered by means of cradle 20. The bales may be delivered to stock by being simply tipped off intact using the conveyor chains, or unwound and gradually fed out by mechanism 22.

Figure 6:
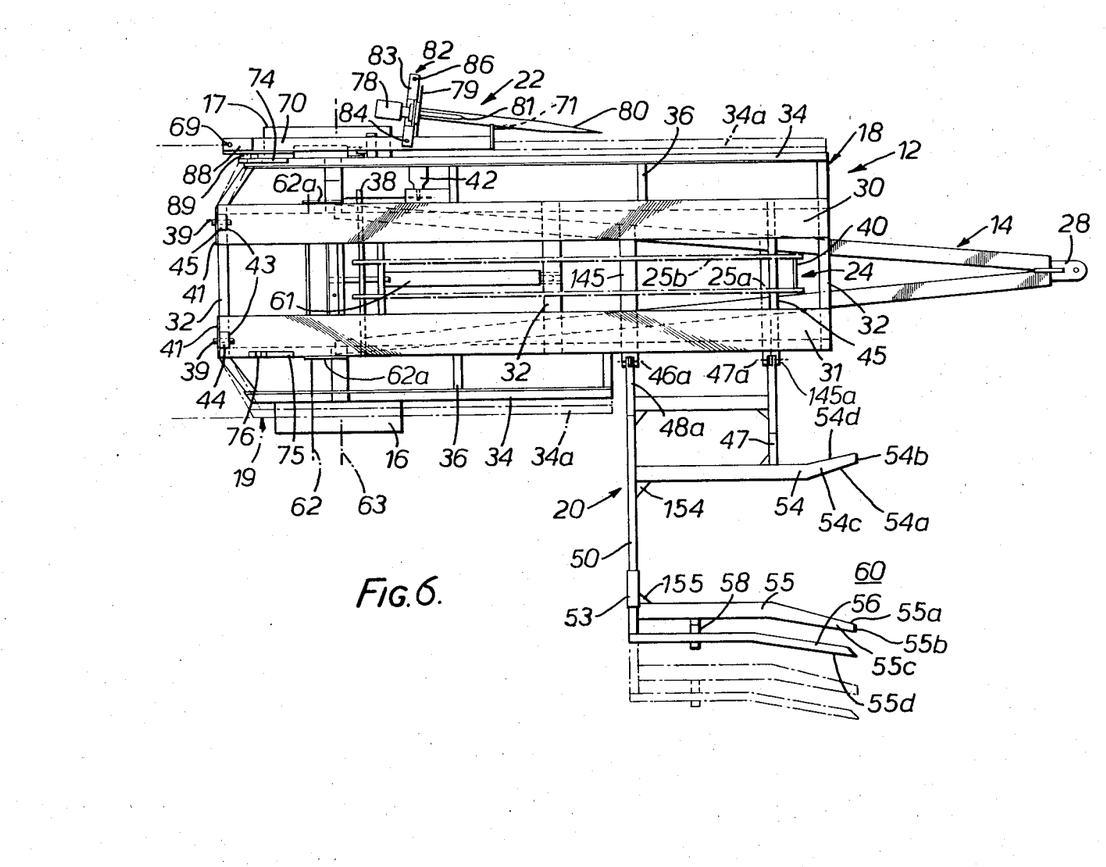
FIG. 6 is a plan view of the handler, the feed-out mechanism being shown in its retracted position.

Chassis 14 is wholly A-frame to minimise stress points and has a tow-hitch 28 at its forward end for attachment behind a tractor, truck or pick-up. Tray 18 is made up of a pair of longitudinal, laterally inclined floor plates 30, 31 of inverted shallow channel section, resting on lower side rails 33 and crosspieces 32. Respective upper side rails 34 are supported by laterally upwardly inclined posts 36. One of rails 34 stops short of cradle 20, as best seen in FIG. 6. It will be noted that plates 30, 31 and posts 36 define an open trough in which plates 30, 31 form a shallow V floor and posts 36 bound a more sharply angled V. This V-configuration helps keep the bales aligned. Conveyor chains 25a, 25b lie in the space between plates 30, 31 and extend between rearward drive sprockets on a shaft 38 and forward idler sprockets on shaft 40. Shaft 38 is rotated as required, in either direction, by hydraulic motor 42.

A secondary support comprising abutment means to restrain bales at the rear is provided by a pair of upstanding detachable forks 44, 45 removably bolted into respective slots 43 at the rear edges of plates 30, 31. Forks 44, 45 extend substantially normally to tray 18 and are each a rectangular section tube with a flat front surface and a rear surface which is tapered in a wedge-shaped outer end portion from a heel 44a, 45a to a fork tip 44b, 45b. The forks are mounted in a manner permitting some angular flexing with respect to the tray. The length of the forks is preferably at least 50%, most preferably between 75 and 85%, of the bale diameter the machine is designed to handle, and the forks are preferably between 50 and 70% of the bale diameter apart. These dimensions ensure adequate distrubuted support for the bale stack when unloading or reloading as hereinafter described.

Figure 3A:
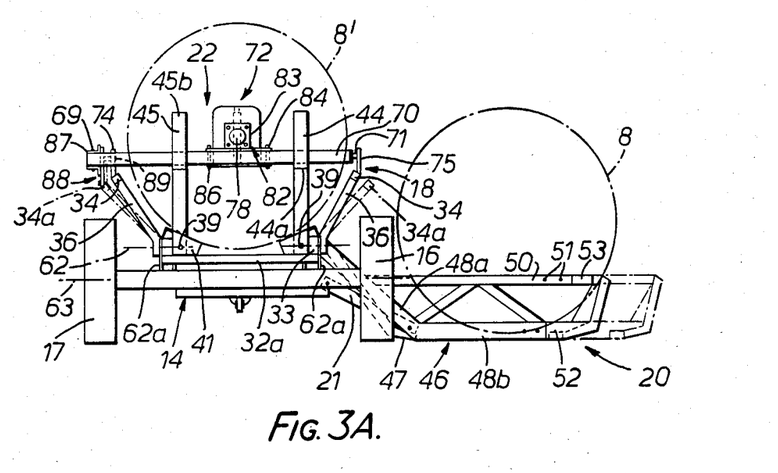
Figure 3B:
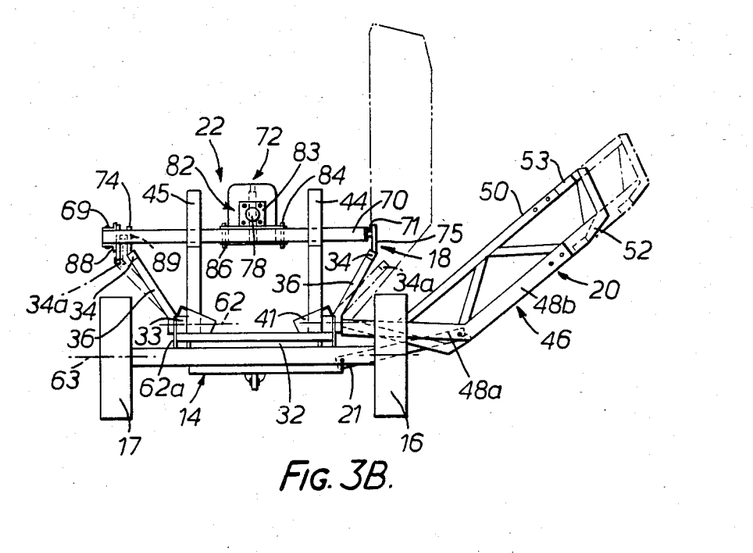
FIG. 3B is a view similar to FIG. 3A but showing the cradle raised to roll a bale thereon onto the tray.
Figure 4:
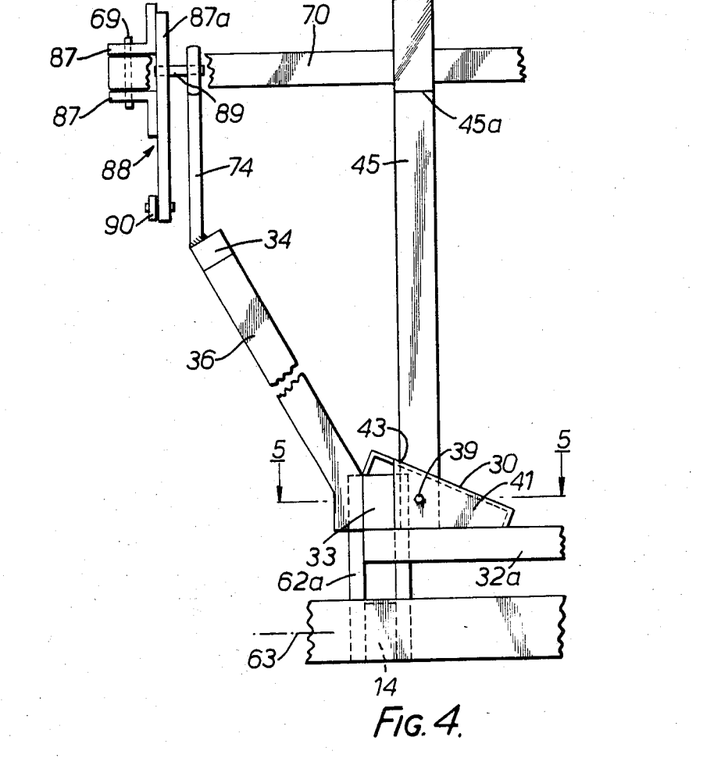
FIG. 4 is an enlargement of part of FIG. 3A, with a small portion cut away.
Figure 5:
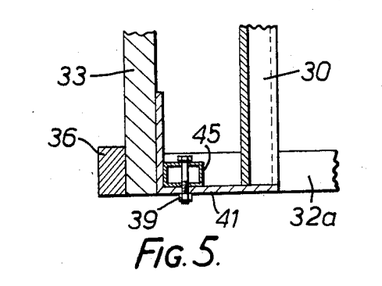
FIG. 5 is a cross section on the line 5—5 in FIG. 4.

Slots 43 are rectangular to closely match the form of forks 44, 45. The forks depend through the slots and rest on an underlying crosspiece 32a (FIGS. 3A, 4 and 5). They are retained in place by thick angle end plates 41 fixed between the floor plates 30, 31 and crosspiece 32a and against the side of respective rails 33 (FIG. 5). Respective bolts, lock-pins of other locking devices 39 (FIG. 3A) removably secure the forks to the end plates.

Side rails 34 may be adjustable in and out (by means not shown) to allow for different bale diameters, as indicated by the broken lines 34a in FIGS. 3A and 6. Suitable dimensions for the tray are 3.9 m long (to hold 3 bales), 1.0 m across the floor, and 1.5 m to 1.8 m between rails 34.

The rear extremities of chains 25a, 25b are located relative to abutment forks 44, 45 so that the chains just effectively engage the rearmost bale when it is in contact with forks 44, 45. This location, which is typically about two thirds of the length of a bale from the plates for a tray of three-bale length, is selected with a view to minimizing chain damage to the rearmost bale and its twine during conveyor operation and yet allow this bale to be moved to and from its position when required.

Loading cradle 20 is best seen in FIGS. 1, 3A, 3B and 6. It includes a pair of laterally extending arms 46, 47 pivoted at 46a, 47a to uprights 145a at the ends of chassis cross beams 145, just outside floor plate 31 of tray 18 and aside the front third of the tray. The cradle is pivotally movable between a pick up position on the ground (FIG. 3A), a bale roll-over position (FIG. 3B), and a vertical transport condition (broken lines in FIG. 3B).

Rear arm 46 is obtusely angled and, in the pick up position of the cradle, includes a downwardly inclined portion 48a and a horizontal portion 48b substantially on the ground (FIG. 3A). A rear rail 50 projects from the inclined portion 48a parallel to and well above horizontal portion 48b. Outer, mutually coupled extensions 52, 53 are telescopically joined to arm 46 and rail 50 and locked in place by suitable pins, bolts or setscrews 51. In this manner, the cradle is of variable width to allow for bales of differing diameter.

Three prongs 54, 55, 56 are secured to and project forwardly from arm 46, arm extension 52 and rail extension 53 respectively. Prongs 54, 55 define a cradle floor and comprise respective elongate support members which project in the direction of travel of the vehicle for passing under a bale to lift and support it. Prong 56 provides an outer restraining rail at the same level as rail 50 and is braced to prong 55 by post 58. Prong 54 is also fixed to the outer end of arm 47. Gussets, e.g. at 154, 155, are provided where required for additional strength. Prongs 54, 55 may normally be about 0.8 m or so apart, variable by telescopic adjustment of extensions 52, 53 to 1.2 m.

Rail 50, its extension 53 and prong 56 perform an important role as restraint members for restraining a bale to its rear and outer sides respectively as the bale (shown at 8 in dot-dash lines in FIGS. 2 and 3A) is picked up and transferred, by raising the cradle with an hydraulic ram 21 until (FIG. 3B) the bale rolls onto the bed of tray 18 During this movement, arm 47 acts on the front of the bale and tends to bias it rearwardly against rail 50: this helps ensure transfer of the bale at a rearmost location. The three prongs are flared so that prongs 54, 55 define at their forward ends opposed edges 54a, 55a (FIG. 6) which, in a horizontal plane, are inclined to the direction of travel so as to be mutually but assymetrically forwardly divergent, for centering a bale approached off-centre, while prong 56 flares outwardly in a manner complementary to edge 55a.

The assymmetry, best seen in FIG. 6, is such that outer edge 55a extends further rearwardly than inner edge 54a forms a smaller taper angle to the longer straight-ahead portion of its prong, than edge 54a and is of greater length than the inner edge 54a. Each of these differences ensures that an off-centre bale is pushed to the centre (relative to prongs 54, 55). Prongs 54, 55 are tapered at their forward ends in both vertical and horizontal planes. In particular, they have inclined top surfaces 54c, 55c adjacent edges 54a, 55a and outer side edges 54d, 55d which converge towards edges 54a, 55a, so that these front portions of the prongs are wedge-shaped and taper in both vertical and horizontal planes to forward tips 54b, 55b, to further facilitate engagement under a bale. The prongs thus define a rearwardly contracting bale entry region 60. These features greatly facilitate pick up on-the-run, permitting tractor speeds of 8 to 10 kmh; the bale restraints 50, 53, 56 prevent the bale tipping off the cradle, the assymmetrical convergence of edges 54a, 55a reduces the required approach accuracy to avoid spearing as the edges push an off-centre bale to a centered location, and the wedge shaped tips ensure prong travel under rather than into the bale.

Figure 1:
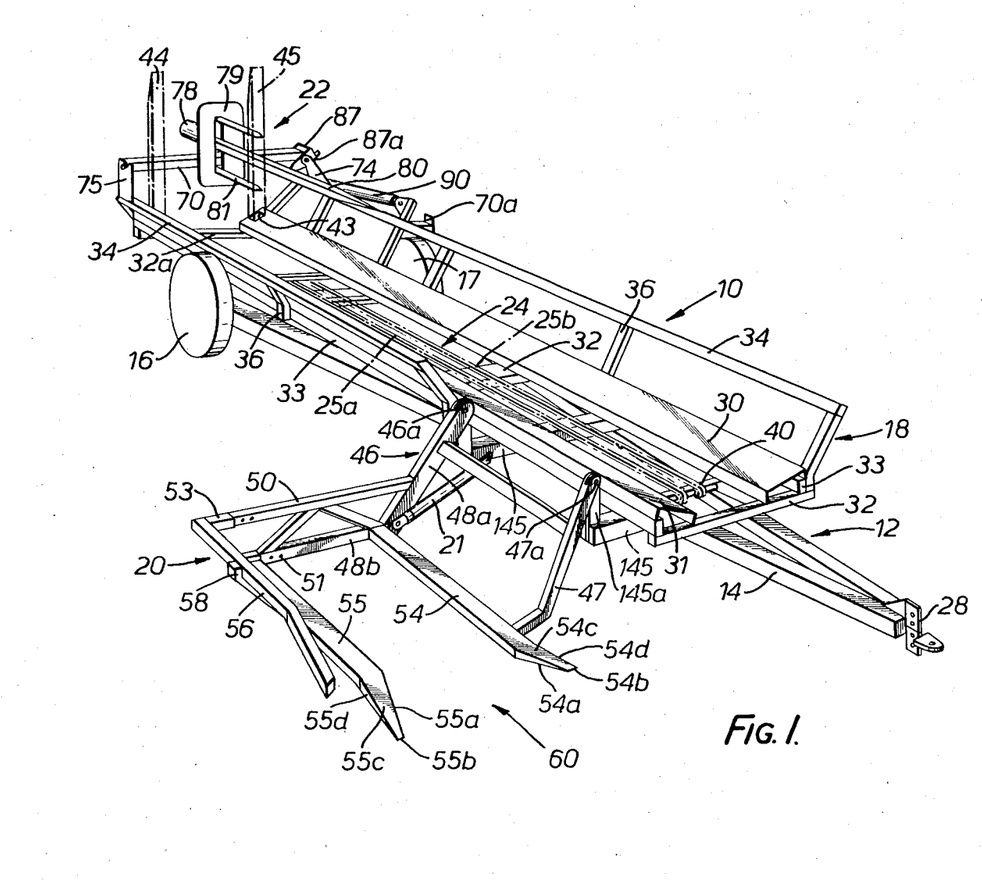
FIG. 1 is a perspective view of a round bale handler embodying various aspects of the invention, the feed-out mechanism being shown in the bale engaging position.
Figure 2:
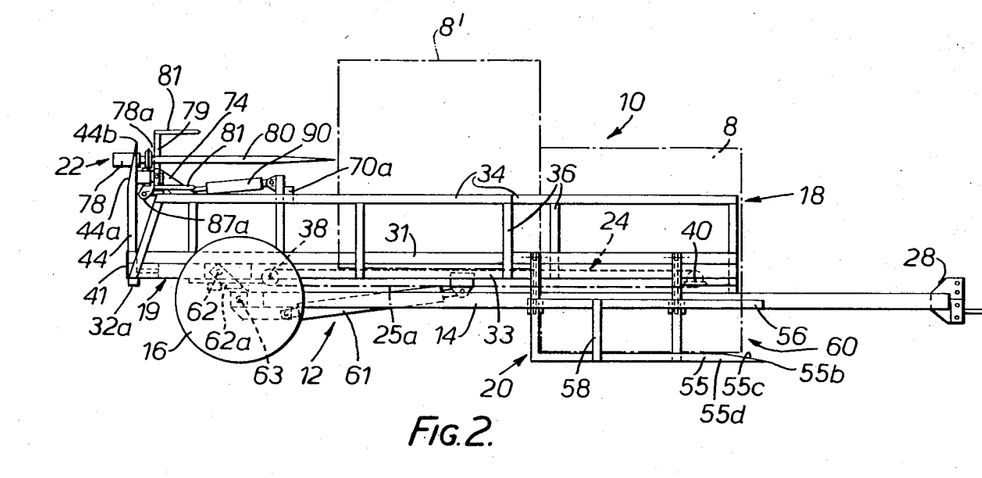
FIGS. 2 and 3A are respectively side and rear elevations of the handler as viewed in FIG. 1.

Once a bale is transferred from cradle 20 to the front of tray 18, it is moved back to the centre of the tray by actuating conveyor chains 25a, 25b. Another bale can now be picked up and transferred, and the two moved back against forks 44, 45 to make way for a third. FIG. 2 shows one bale 8 just picked up by the cradle and the previously loaded bale 8' moved back to the centre of tray 18 (to load a third, feed-out mechanism 22 would of course have to be retracted aside as in FIG. 6). The collection of three bales is transported to the storage site where a large hydraulic ram 61, pinned between the rear of chassis 14 and a mid-point on the tray, is activated to tip the tray to a position past vertical for unloading the three bales in the tray as a vertical stack.

Figure 7:
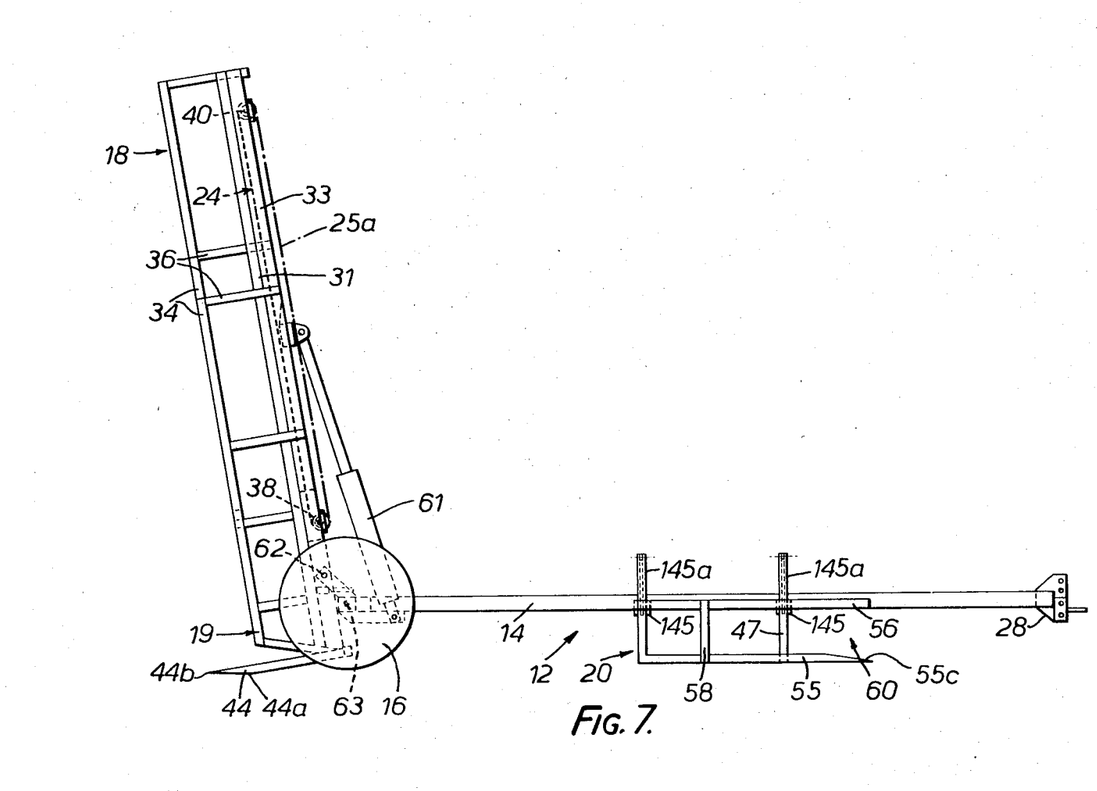
FIG. 7 is a side elevational view, with the tray rearwardly tilted to its unloading/reloading position, and the feed-out mechanism omitted for clarity.

To facilitate stacking and later reloading of the bales, tray 18 is pivoted, to brackets 62a upstanding rearwardly from the chassis, on an axis 62 as close as possible behind the vertical plane containing the ground wheel axis 63. The tray when fully lowered is disposed just above the wheel axles, and ram 61 is arranged to tip the tray to an unloading/reloading position (FIG. 7) past the vertical (i.e. more than 90° from its fully lowered position), at which the stack remains stable. In general, this angle past vertical may be as small as 5° in some conditions but for sufficient reliability of effect (to be decribed) should be at least 10° in most conditions. There will be an upper limit beyond which the stack will become unstable by toppling over. In most cases, toppling will occur at angles of the order of 30° or more past vertical. A preferred range is 10° to 15° past vertical. The unloading/reloading position is determined by the maximum extension of ram 61. In this specific case, the unloading/reloading position is at 100°. The heels 44a, 45a, of forks 44, 45 take the weight of the rear of the machine, including the bales, in the unloading-/reloading position: on hard level ground the ground wheels 16, 17 will be lifted off the ground. If a soft bed, e.g. sand or shavings, is prepared for the stack, the fork heels will lie in this bed below the harder ground on which wheels 16, 17 rest. Fork tips 44b, 45b remain just above heels 44a, 45a and thus do not dig into the ground.

To unload and stack three bales on tray 18, the tray is first tilted back to the vertical position, held momentarily to steady the stack, further tilted to the aforesaid unloading/reloading position, say 100°, and then withdrawn. The stack remains behind as the forks are drawn from under the bottom bale. The intermediate 90° position may be determined, for example, by the first notch of a dual position control switch for ram 61. To reload the stack, the tray is first tilted to 90°, its position checked, corrected if necessary and then tilted a further, say, 10°, and the vehicle then backed towards the stack: with the heels of forks 44, 45 on the ground, the forks can push under the bottom bale: the arrangement whereby the forks bear the weight of the machine ensures sufficient force to execute this penetration. The vehicle is backed until the tray strikes the top bale. The tray is then tipped forward to the vertical simultaneously as the vehicle is further backed: because of the location of axis 62, the lower portion 19 of the tray between forks 44, 45 and axis 62 pushes the bottom bale away as forks 44, 45 lift the stack and turn it with the tray. Because the bottom bale is pushed away, the whole stack is stabilised by being induced to tip forwardly onto the floor of the tray. The middle and top bales do not tend to fall back as with prior trays pivoted at or near ground level with a maximum tilt angle of 90°. It will be appreciated that axis 62 is so displaced from the rear end of the bed in a direction parallel to the bed, that the portion 19 is sufficient to so stabilise the stack. Conveniently, for this purpose, axis 62 should preferably be close to ground wheel axis 63 at about half the length of a bale from forks 44, 45. Portion 19 also acts to institute withdrawal of the forks during unloading, when the tray is tipped from 90° to 100°.

Because axis 62 is very close to the ground wheel axis 63, as close as possible while still permitting the 100° tilt, the weight of the bales remains over or forwardly of the wheels for most of the tilting movement of the tray, and when the tray is tilted back the net weight of the loaded machine is balanced about the wheel axis. With some prior arrangements, the location of the tray axis well behind the wheel axis causes an imbalanced weight moment which tends to lift the tractor coupling and thereby cause instability: this is achieved by ballasting or otherwise weighting these machines in front of the wheel axis, an expensive requirement. This may be critical when the draw vehicle is a truck or pick-up. With the inventive arrangement, there is no instability even when the ground wheels are off the ground as described.

Figure 8:
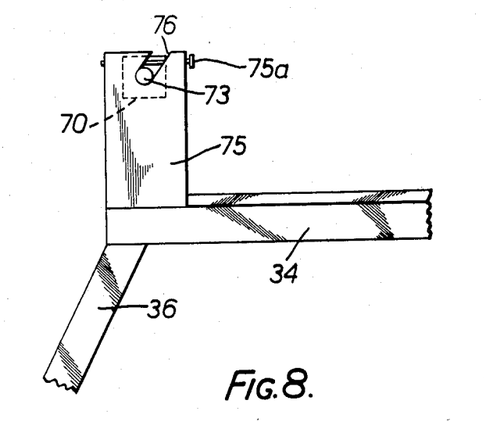
FIG. 8 is an enlargement of part of FIG. 2, showing the bracket by which the feed-out mechanism is locked in its bale engagement position.

Turning now to the detail of feed-out mechanism 22, a substantial swing bar 70 centrally supports bale rotation means 72 and is itself pinned at 69 to an upstanding bracket 74 at the rear end of one of tray rails 34 for rotational movement through 270° between a retracted position (FIG. 6) parallel to and just outside the respective rail 34, (in which it is locked on rest 70a—FIG. 1) and a bale engagement position (FIGS. 1, 2, 3A and 4) in which the bar extends across the tray and is locked in place by engagement of a pin 73 (FIG. 8) at the free end of the bar in an inclined slot 76 at the top of a further bracket 75 at the end of the other of rails 34. Slot 76 is closed by a temporary pin keeper 75a.

Bale rotation means 72 includes an hydraulic motor 78 and, fixed to the shaft 78a of the motor, a plate 79 which carries three prongs—a large central prong 80 and two smaller prongs 81. It is normally preferred to have at least two prongs. The motor is fixed to a vertical plate 83 of a bracket 82 which includes a channel leg by which it is hinged to bar 70 at 84 and detachably bolted in place at 86. Removal of bolt 86 permits the prong assembly to be turned parallel to the direction of travel in the retracted position of the feed-out mechanism (FIG. 6).

Figure 9:
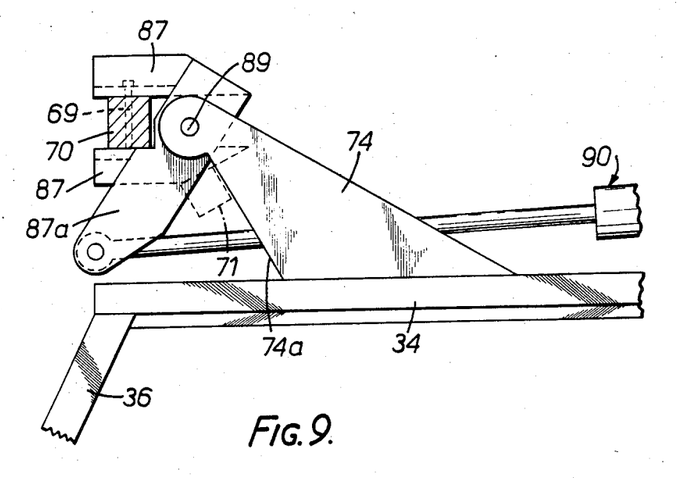
FIG. 9 is an inside elevation of the bi-axial mounting for the feed-out mechanism.
Figure 10:
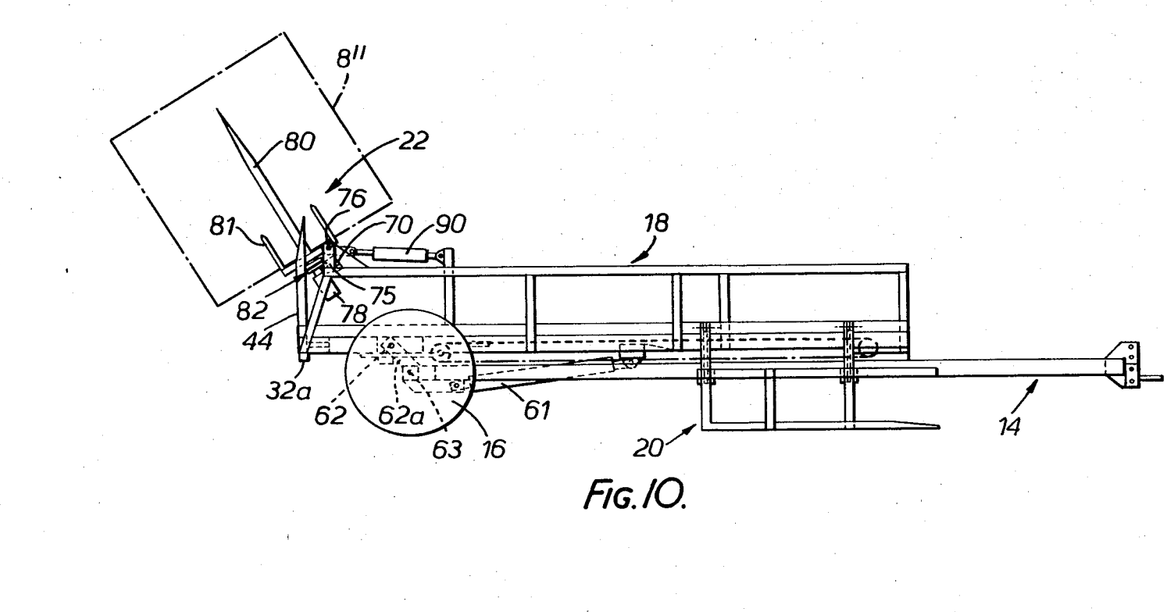
FIG. 10 is a view similar to FIG. 2 but with the feed-out mechanism in its bale unwind position.

The pivot arrangement atop bracket 74 is in fact bi-axial and is best seen in FIGS. 4 and 9. Bar 70 is hinged on a vertically extending pin 69 within a U-section holder 88 which is itself hinged on a horizontally extending pin 89 to bracket 74. Holder 88 comprises a pair of truncated angle brackets 87 fixed to an inclined heavy gauge plate 87a. The latter axis allows the bar 70 to be rotated by an hydraulic ram 90 through an angle between 110° and 150°, preferably about 120°–135°, about an axis parallel to the bar in the bale engagement position to raise prongs 80, 81 to a rearwardly upwardly inclined feed-out position (FIG. 10). Bracket 74 is of a somewhat birdneck shape (FIG. 9) to provide an inlined undercut edge 74a abutted by bar 70 in the feed-out position: the location of bar 70 at this position is shown in dot-dash lines 71 in FIG. 9. Ram 90 is pinned between an extension of a post 36 and a depending leg of plate 87a.

In the feed-out position of mechanism 22, motor 78 may be activated to rotate prong 80 and revolve prongs 81, thereby to rotate and unwind a bale 8" held by the prongs and so dispense its hay onto the ground behind the vehicle. It will be noted that motor drive shaft 78a is directly coupled to prongs 80, 81 via plate 79: this is in contrast to a geared or chain coupling and allows positive high speed (e.g. 300 rpm), high torque rotation of large round bales. A bale can be fed out in as little as 1 minute by achieving a sufficient speed to separate even a stubbornly bound bale. There is complete control of speed and duration of feed out in either rotational direction. The raised location of the bale in the feed-out position gives good visibility to the tractor driver over the top of other bales which may be on tray 18, and is determined and held by engagement of bar 70 with a matching seat on a rear underside face of bracket 74.

It will be understood that the various hydraulic power units (motor 42 for conveyor chains 25a, 25b; motor 78 for the bale unwinder; large ram 61 for lifting 18; ram 21 for cradle 20; and ram 90 for raising the feed-out mechanism) are all connected in suitable hydraulic circuits, including fluid sources, to controls on the towing tractor or on the front of chassis 14. For illustrative convenience, the respective hydraulic lines are not shown in the drawing.

By way of summary, the illustrated machine is used as follows. Once a crops has been cut, raked and bound into round bales scattered about a paddock, handler 10 is towed around the paddock by a tractor and picks up bales at least three at a time. Cradle 20 is brought up to the end of each bale in turn, the bale centered if required and scooped up on-the-run, at say 8 to 10 kmh, and transferred onto the bed of tray 18 by raising the cradle sufficiently to allow the bale to roll across. While motor 42 is activated to push the bale back along the tray, cradle 20 is being lowered and a further bale approached and picked up. In this way, three bales may be loaded onto the tray in as little as 30 seconds. The handler is then towed at speed to the storage site, the tray tilted as described and the bales left in a stack. Alternatively, forks 44, 45 may have been removed by undoing bolts 39 and the tray tilted slightly to lay the bales end-to-end in a horizontal stack on the ground. Either method of unloading for storage can be executed in about 30 seconds. During transport, a fourth bale may be carried if desired by the cradle, or the cradle is tipped up through 90° to minimize the overall width of the vehicle. Prior handlers are generally unable to carry a bale in the cradle during ground travel because of the lack of adequate restraints to maintain the bale in the cradle.

It should be noted that the illustrated handler is readily able to "stack" "or reload" one, two or three bales. Prior machines with clamps to steady the stack are not generally adjustable for numbers of bales other than the prescribed operating number(s).

For recovery and delivery to stock, a vertical stack can be re-loaded, in as little as 30 seconds, by tipping tray 18 through 100° in the manner detailed and bringing forks 44, 45 under the stack. A horizontal row can be re-loaded with the cradle. To unwind the bales, the front bale must be pushed over into the cradle (or driven by the chains onto a forward extension of the tray—not shown), the other two moved forward by the conveyor chains, bar 70 swing right round, bale rotation means 72 locked in place, and the rear bale pushed back, by the chains, onto the three prongs. The bale is then lifted up and over by ram 90 (FIG. 10) and rotated for feed-out.

Figure 11:
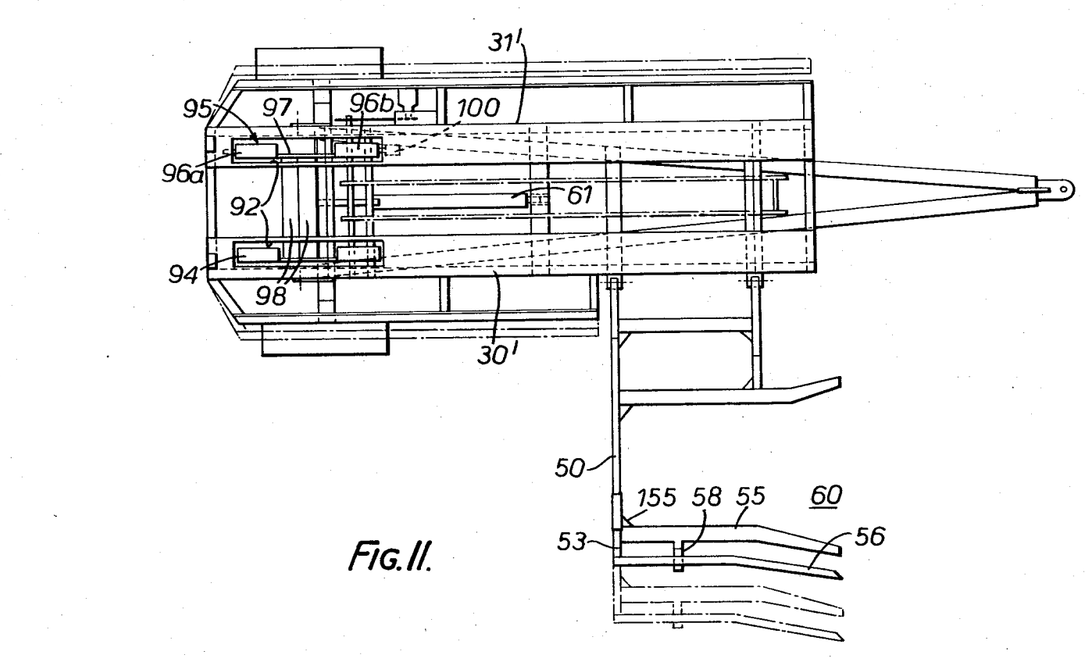
FIG. 11 is a view similar to FIG. 6 of a handler with an alternative feed-out mechanism.

An alternative feed-out mechanism is shown schematically in FIG. 11. Here, tray floor plates 30', 31' are slotted at 92 to reveal respective roller assemblies 94, 95 which protrude above the floor level of the tray. Each assembly comprises front and rear component rollers 96a, 96b connected at their peripheries by a longitudinal rod 97. Rods 97 are bridged by transverse lifter plates 98 bent to about 150° at the centres so as to be concave when viewed from above. Roller assemblies 94, 95 are rotated by a further hydraulic motor 100, in one case directly and in the other via a chain transmission. As the roller assemblies rotate on their axes, rods 97 revolve and cause plates 98 to move periodically up and down. The roller assemblies rotate and thereby unwind a bale resting therein—the hay passes out over floor plate 30' or 31'—while lifter plates 98 bounce it up and down to factiliate loosening of the bale layers.

In a modification of the illustrated machine for larger scale operation, the tray is made wide enough to support two side-by-side rows of three bales each. It will also be appreciated that the machine is readily able to handle large rectangular bales.

I claim:

1. A bale handler comprising:
    a body with a pair of ground wheels rotatable substantially on a common axis;
    a bed for supporting two or more round bales end-to-end;
    pivot means for rotatably supporting said bed on said body for rearward tilting movement about a horizontal axis to unload the bales as a vertical stack;
    means to effect said rearward tilting movement of said bed; and
    secondary support means upstanding from the rear end of the bed and extending substantially normally therefrom, for abutting the rearmost bale thereon and supporting the bales as the bed is tilted, which secondary support means terminates at an outer tip and is shaped to define heel means substantially nearer said tip than to said bed;
    wherein, by means of said rearward tilting movement, said bed may be brought from a fully lowered position to an unloading/reloading position past vertical at which the stack remains stable and said heel means of the secondary support means contacts the ground and bears the weight of the bed and bales thereon;
    and wherein said horizontal axis is located close behind the vertical plane containing said common axis of the ground wheels and is displaced from said rear end of the bed in a direction parallel to the bed so that the portion of said bed between said support means and said axis which moves rearwardly as the bed is lowered from said position during the reloading is sufficient to stabilize the stack.

2. A bale handler according to claim 1 wherein said bed in its fully lowered position is disposed just above one or more axles for said ground wheels.

3. A bale handler according to claim 1 wherein said unloading/reloading position is at least 5° past vertical.

4. A bale handler according to claim 1 wherein said unloading /reloading position is between 10° and 15° past vertical.

5. A bale handler according to claim 1 further including a loading cradle moveably mounted on said body and projecting laterally of the bed for picking up bales from the ground on-the-run, and means for moving said loading cradle to transfer a picked up bale onto the bed.

6. A bale handler according to claim 5 wherein the loading cradle comprises:
    a pair of laterally spaced support members which project in the direction of travel of the vehicle for passing under a bale to lift and support it and which define at their forward ends opposed edges which, in a horizontal plane, are inclined to the direction of travel so as to be mutually forwardly divergent, said inclined edge which is further from said bed extending, in said direction of travel, further rearwardly than the other inclined edge, whereby to facilitate centering a bale approached off-centre, each support member further being tapered at its forward end, in both vertical and horizontal planes, to facilitate the engagement under a bale; and
    a pair of restraint members positioned to restrain the bale respectively to its rear and outer sides, relative to the vehicle, as it is lifted and supported by said support members.

7. A bale handler according to claim 1 further including conveyor means extending part of the length of said bed for moving bales to and fro on the bed, wherein the rear bale engaging extremity of the conveyor means is so disposed with respect to said secondary support that the conveyor means just effectively engages the rearmost bale when such bale is contact with the secondary support.

8. A bale handler according to claim 1 wherein said secondary support means comprises pair of elongate forks and said heel means is defined by respective rear surfaces of said forks which taper from each end of the forks.

9. A bale handler according to claim 8 wherein said forks are detachably mounted to said bed to permit horizontal stacking of bales from the bed.

10. A bale handler comprising:
    a vehicle which defines a bed for supporting bales;
    a loading cradle moveably mounted to the vehicle for picking up bales form the ground on-the-run; and
    means for moving said cradle to transfer a picked up bale onto the bed;

wherein the loading cradle comprises:

a pair of laterally spaced support members which project in the direction of travel of the vehicle for passing under a bale to lift and support it and which define at their forward ends opposed edges which, in a horizontal plane, are inclined to the direction of traval so as to be mutually forwardly divergent, said inclined edge which is further from said bed extending, in said direction of travel, further rearwardly than the other inclined edge, whereby to facilitate centering a bale approached off-centre, each support member further being tapered at its forward end, in both vertical and horizontal planes, to facilitate engagement under a bale; and a pair of restraining members positioned to restrain the bale respectively to it s rear and outer sides, relative to the vehicle, as it is lifted and supported by said support member.

11. A bale handler according to claim 10 wherein the outer side bale restraint member flares outwardly at its forward end in a manner complementary to the forwardly divergent edge of the nearer of the said support members.

12. A bale handler according to claim 10 wherein said inclined edges exhibit different lateral taper angles.

13. A bale handler according to claim 10 wherein said cradle includes mounting arms which project laterally of the vehicle and are pivoted to the vehicle so that the cradle may be lifted to cause the bale to roll onto said bed.

14. A bale handler according to claim 10 further including conveyor means extending part of the length of said bed for moving bales to and fro on the bed, and abutment means at the rear end of the bed for abutting the rearmost bale thereon, wherein the rear bale engaging extremity of the conveyor means is so disposed with respect to said abutment means that the converor means just effectively engages the rearmost bale when such bale is in contact with the abutment means.

15. A bale handler according to claim 10 wherein each support member is tapered at its forward end, in a vertical plane, whereby such taper on the support member further from said bed extends further rearwardly than the taper on the nearer support member.

16. A bale handler according to claim 10 wherein each support member is tapered at its forward end, in a vertical plane, over that portion of the support member bordered by the respective said tapered edge.

* * * * *